United States Patent [19]

Petermann et al.

[11] Patent Number: 5,063,542
[45] Date of Patent: Nov. 5, 1991

[54] PIEZOELECTRIC TRANSDUCER WITH DISPLACEMENT AMPLIFIER

[75] Inventors: Steven G. Petermann, Plano; Keith W. Katahara, Allen; Herbert A. Wolcott, II, Dallas, all of Tex.

[73] Assignee: Atlantic Richfield Company, Los Angeles, Calif.

[21] Appl. No.: 354,067

[22] Filed: May 17, 1989

[51] Int. Cl.$^5$ .............................................. H04R 17/00
[52] U.S. Cl. ..................................... 367/166; 367/163; 181/106; 181/119
[58] Field of Search ............. 181/106, 119; 310/337, 310/322, 323, 324, 334, 333; 367/157, 159–167, 172, 174

[56] References Cited

U.S. PATENT DOCUMENTS

| | | | |
|---|---|---|---|
| 3,593,255 | 5/1969 | White | 367/157 |
| 4,319,345 | 3/1982 | Dennis | 367/25 |
| 4,391,299 | 7/1983 | Holmes | 367/171 |
| 4,649,525 | 3/1987 | Angona et al. | 367/31 |
| 4,649,526 | 3/1987 | Winbow et al. | 367/35 |
| 4,682,308 | 7/1987 | Chung | 181/106 |
| 4,715,019 | 12/1987 | Medlin et al. | 367/31 |
| 4,718,046 | 1/1988 | Medlin | 367/31 |
| 4,862,990 | 9/1989 | Cole | 181/106 |

*Primary Examiner*—Brian S. Steinberger
*Attorney, Agent, or Firm*—Michael E. Martin

[57] ABSTRACT

A displacement amplifier interconnects a piezoelectric actuator with a displacement member and comprises respective bellows members of differential diameter defining first and second expansible chambers which are liquid filled and respond to linear displacement of a stack of piezoelectric disks to provide an amplified linear displacement to the displacement member. The transducer is particularly useful as a signal transmitting or receiving transducer for acoustic wave generation or measurement for wellbore logging tools.

8 Claims, 1 Drawing Sheet

PIEZOELECTRIC TRANSDUCER WITH DISPLACEMENT AMPLIFIER

BACKGROUND OF THE INVENTION

1. Field of the Invention

The present invention pertains to a piezoelectric-type transducer particularly adapted to generating or receiving acoustic signals and having a hydraulic fluid coupling for amplifying mechanical displacement of the piezoelectric actuator.

2. Background

Piezoelectric elements are widely used as conversion devices for electrical to mechanical energy and vice versa. One application for piezoelectric signal transmitting elements is in conjunction with so-called acoustic-type well logging tools wherein acoustic signals are generated in a fluid filled borehole and propagated through the earth formation surrounding the borehole and whereupon reflected acoustic signals are received by suitable transducer elements for determining certain formation characteristics. Piezoelectric elements are particularly attractive for use in such applications because of their mechanical simplicity and reliability, frequency response and energy conversion efficiency.

One disadvantage of piezoelectric structures in transducer applications is that they have a relatively small elongation or strain characteristic which does not always effectively couple energy to and from the piezoelectric structure. Accordingly, relatively complex piezoelectric structures have been utilized, particularly in acoustic energy transducer elements such as those described in U.S. Pat. No. 4,649,525 to F. A. Angona et al, and U.S. Pat. No. 4,715,019 to Medlin et al.

Since piezoelectric actuators are particularly useful for generating acoustic waves in fluids for various applications, there has been a long-felt need to provide an acoustic signal transmitter and/or receiver adapted for the dimensional constraints and operating environments associated with such applications as underwater marine signalling and for use in conjunction with wellbore tools. These applications demand a high mechanical advantage in the transducer in order to suitably generate and receive pulse-type acoustic signals. The mechanical advantage provides a means to transform the large force and small displacement of the piezoelectric element into a smaller force and larger displacement in the fluid that is acted upon. Such a transformation is important because of the large acoustic impedance contrast between the fluid and the piezoelectric element. One improvement in such types of transducers is described in U.S. patent application Ser. No. 07/319,067 filed Mar. 6, 1989 to Keith W. Katahara and assigned to the assignee of the present invention. The present invention is directed to another improved piezoelectric-type transducer which includes a novel displacement amplifier for the piezoelectric actuator.

SUMMARY OF THE INVENTION

The present invention provides a piezoelectric-type transducer having a displacement amplifier for improved conversion between electrical and mechanical energy. In accordance with one aspect of the present invention, a piezoelectric-type transducer is provided which utilizes a piezoelectric actuator which is coupled to a displacement amplifier which amplifies the linear displacement of the piezoelectric actuator when energized by an electrical signal or, conversely, a mechanical displacement is converted into the generation of an electrical signal by the piezoelectric actuator.

In accordance with another aspect of the present invention, there is provided a piezoelectric-type transducer wherein the displacement of a piezoelectric element is amplified by displacement of fluid from one expansible chamber into another expansible chamber wherein the fluid displaced creates mechanical displacement of structure defining the expansible chambers to produce a mechanical advantage which provides improved coupling of mechanical energy to a fluid, for example.

Still further in accordance with the present invention, there is provided an improved piezoelectric transducer particularly adapted for generating or receiving acoustic signals in a wellbore tool such as an acoustic logging tool or the like.

The above described features and advantages of the present invention together with other superior aspects thereof will be further appreciated by those skilled in the art upon reading the detailed description which follows in conjunction with the drawing.

DESCRIPTION OF A PREFERRED EMBODIMENT

Figure 1:
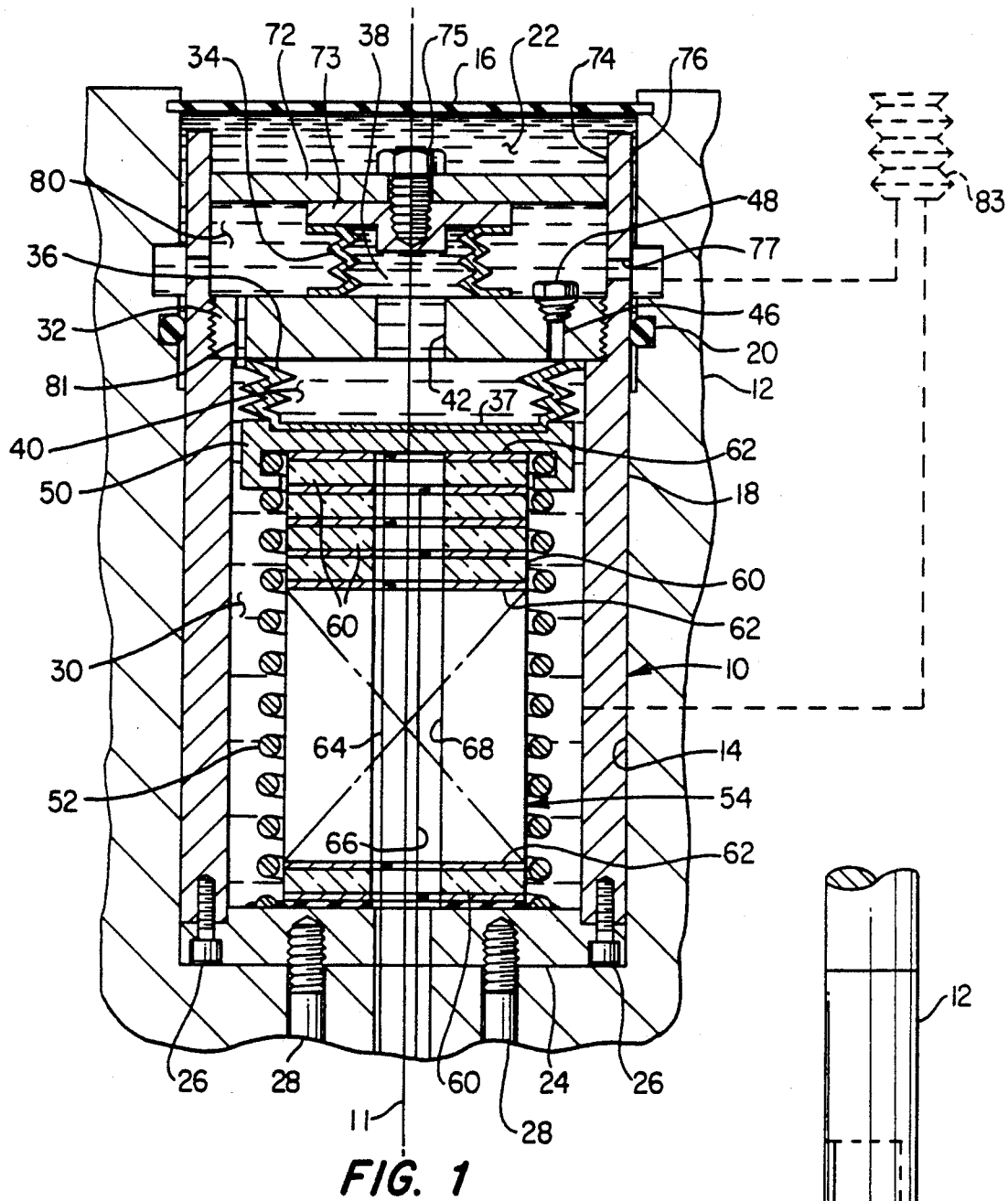
FIG. 1 is a longitudinal central section view of an improved piezoelectric-type transducer in accordance with the present invention.

Referring to the drawing figures and, FIG. 1 in particular, there is illustrated an improved piezoelectric-type transducer generally designated by the numeral 10 and adapted to be disposed in a housing 12 for a well logging tool or the like. The housing 12 is adapted to have a generally cylindrical cavity 14 formed therein for receiving the transducer 10, which cavity is closed at one end by a flexible membrane-type member 16. The transducer 10 includes a generally cylindrical outer body member 18 which is removably disposed in the cavity 14 and is in sealing engagement with a conventional O-ring type seal 20 to define between the seal 20 and the member 16 a liquid-filled chamber 22.

The transducer 10 is further characterized by a removable end cover member 24 of the body 18 which is suitably secured to the body by threaded fasteners 26 or the like. The transducer 10 may be suitably secured in the cavity 14 by fasteners 28 threadedly engaged with the cover member 24. The body 18 defines an internal space 30 between the cover 24 and a removable transversely extending body part 32. The body part 32 may be threadedly engaged with cooperating internal threads formed on the body 18 as illustrated. The body part 32 suitably supports opposed axially extensible bellows members 34 and 36 which, respectively, define liquid-filled expansible chambers 38 and 40 and which are interconnected by a passage 42 formed in the body part 32. The chambers 38 and 40 together with the passage 42 may be filled with a suitable low compressibility liquid through a fill port 46 having a removable closure plug 48. A second closable fill port, not shown, may be provided into the chamber 38 through the structure described hereinbelow and which is connected to the bellows 34. The bellows 36 includes a transverse end wall 37 which is engaged by a generally cylindrical part 50 which is connected to a coil extension spring 52 and engaged with an axially extensible and retractable piezoelectric actuator 54. The spring 52 is suitably anchored at one end to the cover 24 and at the opposite end to the member 50, as shown.

The piezoelectric actuator 54 is made up of a plurality of elements such as disk members 60, preferably of piezoelectric ceramic material, which members are bonded on their opposite surfaces to a metallic conductor disk 62. The disks 60 are preferably polarized axially, with adjacent disks polarized in opposite directions. As indicated in FIG. 1, alternate ones of the conductor disks 62 are connected to a common conductor 64 and the other conductor disks 62 are connected to a second common conductor 66. The conductors 64 and 66 may be suitably trained through a passage 68 formed centrally in the actuator 54 and in alignment with a passage 70 formed in the part 24 and the housing 12. An electrical potential may be imposed simultaneously across each one of the disk members 60 to cause all of the disk members to elongate in the direction of the central axis 11 of the transducer 10. The terms "linear" and "elongation" as used herein are intended to define one dimensional change and may encompass straight line as well as curvilinear motion. A preferred material for use in manufacturing the piezoelectric disks 60 is a lead-zirconate-titanate (PZT) ceramic. This particular type of ceramic exhibits relatively little change in volume when excited electrically and axial extension in the direction of the axis 11 is accompanied by a lateral contraction. The extension spring 52 is, in the deenergized condition of the actuator 54, under sufficient tension to provide a compressive force on the stack of actuator disks 60 to reduce hysteresis in the operation of the actuator 54 and minimize excessive tension in the actuator disks which might fracture the disks in response to electrical stimulation.

Notwithstanding the ability of the piezoelectric actuator 54 to extend and contract axially with respect to the axis 11, the magnitude of linear extension and contraction of the actuator is often insufficient to provide displacement suitable for propagating an acoustic signal such as in the application of an acoustic borehole logging tool. Accordingly, by providing the mechanical amplifier defined by the bellows members 34 and 36 and the support member 32 in the configuration shown in FIG. 1 and described herein, an amplification of axial displacement may be imposed on a displacement member such as a piston 72 disposed in the chamber 22 in close fitting relationship to a bore wall 74 defined in part by an extension 76 of the body 18. A chamber 80 is formed between the piston 72 and the member 32. The chamber 80 may be in communication with the chamber 22 by a restricted passage 77 in the body extension 76. Alternatively, restricted flow communication between the chambers 22 and 80 may occur through the space between the piston 72 and the wall 74. Axial movement of the piston 72 couples acoustic energy to fluid in a borehole through the fluid in the chamber 22 and the flexural member 16. The piston 72 is suitably secured to an end cap 73 secured to the bellows 34 and is removable from such end cap by removal of a threaded fastener 75. The diameter of the bellows 36 is substantially greater than the diameter of the bellows 34 so that a small linear displacement of the bellows 36, which will effect displacement of a given amount of fluid in the chamber 40, will effect a proportionally greater axial extension of the bellows 34 when the fluid is transferred to the chamber 38. In this way mechanical amplification of axial extension of the actuator 54 may be conveniently imparted to the piston 72. Conversely, a predetermined axial force acting on the piston 72 may be amplified to effect a greater compressive force acting on the member 50 and the actuator 54 to provide a proportional electrical signal.

In an application of the transducer 10 in a wellbore acoustic logging tool, for example, the fluid occupying the bellows cavities, 38 and 40, is preferably of significantly lower compressibility than the fluid occupying the cavities 22, 80 and 30. For instance the former might be mercury and the latter a motor oil or hydraulic fluid. The cavities 80 and 30 are fluid-filled, interconnected by a passage 81 and statically pressure-equalized with the surrounding borehole fluid. This equalization may be obtained by, for example, a variable volume reservoir 83 in communication with the chambers 30 and 80 and responsive to borehole fluid pressure. The cavities 22, 30 and 80 are hydraulically connected by passageways that are large enough to equalize pressure over periods of 10 seconds or more, but not over periods of less than 0.01 seconds.

The operation of the transducer 10 is believed to be readily understandable from the foregoing description. Briefly, however, the transducer 10 is suitably installed in the cavity 14 and the chamber 22 is filled with a suitable liquid by means, not shown. Upon energization of the actuator 54 by a suitable electrical source, also not shown, the actuator is energized to extend linearly along the axis 11 to displace fluid from the chamber 40 formed by the bellows 36 to the chamber 38 formed by the bellows 34 and to amplify the axial movement of the actuator as imparted to the piston 72. Movement of the piston 72 by repeated pulse-type electrical energization of the actuator 54 may be accomplished to effect the generation of an acoustic wave form which may be transmitted by the tool 12 through borehole fluid to an earth formation or the like. The exemplary transducer 10 is suited to generate acoustic waves in the frequency range from about 100 Hz to 1 or 2 kHz.

Figure 2:
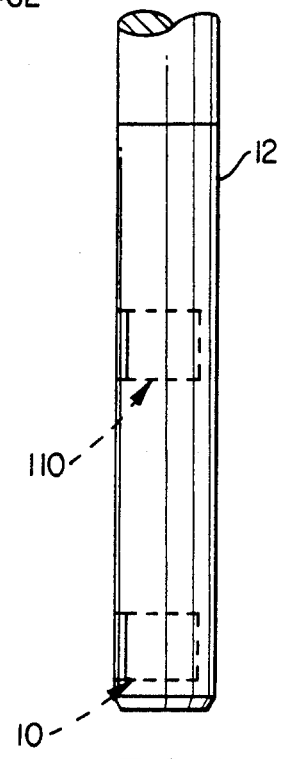
FIG. 2 is a detail elevation of an acoustic logging tool including the transducer of the present invention.

As shown in FIG. 2, the transducer 10 may be used both as a transmitter of acoustic energy and a receiver since imparting displacement of fluid in the chamber 22 by movement of the diaphragm member 16 will effect movement of the piston 72 axially to displace fluid from the chamber 38 to the chamber 40 to effect compression of the actuator disks 60 and delivery of an electrical signal through the conductors 64 and 66 in accordance with known practice with respect to the behavior of piezoelectric materials. Accordingly, in the arrangement of the tool 12 the transducer 10 may be used as a transmitter and a virtually identical transducer 110 may be used as a receiver to detect reflected acoustic waves returning to the borehole fluid from an earth formation.

Conventional engineering materials may be used in manufacturing the aforedescribed transducer using practice known to those skilled in the art and following to some extent the teaching of the prior patent literature as evidenced by U.S. Pat. No. 3,593,255 to J. E. White; U.S. Pat. No. 4,319,345 to J. R. Dennis; U.S. Pat. No. 4,649,526 to Winbow et al; and U.S. Pat. No. 4,718,046 to Medlin. Although a preferred embodiment of the invention has been described in some detail herein, those skilled in the art will recognize that various substitutions and modifications may be made to the transducer described without departing from the scope and spirit of the invention as recited in the appended claims.

What is claimed is:

1. A signal generating transducer useful in acoustic logging tools and the like comprising:

actuator means comprising at least one piezoelectric element which is operable to be elongated in one direction in response to an electrical signal imparted to said piezoelectric element;

a displacement member; and amplifier means interconnecting said actuator means and said displacement member, said amplifier means including a first axially extensible bellows member defining a first liquid-filled chamber, a second axially extensible bellows member defining a second liquid-filled chamber, and means forming a passage interconnecting said first and second chambers for communicating liquid between said chambers and operable to effect linear movement of said displacement member greater than the elongation of said piezoelectric element in response to an electrical signal imposed on said piezoelectric element.

2. The transducer set forth in claim 1 wherein:

said first bellows member has a diameter greater than said second bellows member.

3. The transducer set forth in claim 2 wherein:

said transducer includes a generally cylindrical body member supporting said actuator means and a part supported by said body member and supporting said bellows members, respectively.

4. The transducer set forth in claim 3 wherein:

said means forming said passage includes said part.

5. The transducer set forth in claim 2 including:

spring means operably engaged with said piezoelectric element for imparting a bias force on said piezoelectric element.

6. The transducer set forth in claim 1 wherein:

said actuator means comprises a plurality of disks formed of piezoelectric material, each of said disks being connected for receiving an electrical signal to cause elongation of said disks in a direction corresponding to the central axis of said disks and a member interconnecting said disks with said first bellows member for imparting linear displacement of said amplifier means.

7. A piezoelectric transducer comprising:

a displacement member responsive to a force acting thereon to effect linear displacement;

a piezoelectric element responsive to a force acting thereon to generate an electrical signal proportional to said force; and force amplifier means interconnecting said piezoelectric element and said displacement member and comprising linearly extensible bellows members, defining first and second expansible chambers, respectively, means forming a passage interconnecting said expansible chambers, said expansible chambers being filled with a liquid, said bellows members being dimensioned such that displacement of said displacement member displaces liquid from said first expansible chamber to said second expansible chamber to effect a displacement of said piezoelectric element under a compressive force which is a multiple of the force acting on said displacement member.

8. A piezoelectric transducer comprising:

a piezoelectric element operable to undergo linear displacement in a predetermined direction, said element including electrical conductor means connected thereto for imparting an electrical signal to said element to effect said linear displacement;

a displacement member responsive to displacement of said element to impart energy to a receiving means; and displacement amplifier means interconnecting said element and said displacement member and including means defining a first expansible chamber comprising a first linearly extendable bellows member operably connected to said element, means defining a second expansible chamber comprising a second linearly extendable bellows member operably connected to said displacement member, means forming a passage interconnecting said expansible chambers, said expansible chambers being filled with a liquid, said means defining said first and second expansible chambers each being dimensioned such that linear displacement of said element displaces liquid from said first expansible chamber to said second expansible chamber to elongate said second bellows member to effect displacement of said displacement member over a linear distance which is a multiple of the linear distance over which said element moves in response to an electrical signal imparted thereto.

* * * * *